United States Patent [19]

Engdahl et al.

[11] Patent Number: 5,788,813
[45] Date of Patent: Aug. 4, 1998

[54] CLARIFYING AND/OR FILTERING OF GREEN LIQUOR AND AN APPARATUS THEREFORE

[75] Inventors: Holger Engdahl; Martti Pokkinen; Pekka Törmikoski, all of Savonlinna, Finland

[73] Assignee: Ahlstrom Machinery Oy, Helsinki, Finland

[21] Appl. No.: 704,542

[22] PCT Filed: Mar. 6, 1995

[86] PCT No.: PCT/FI95/00125

§ 371 Date: Sep. 11, 1996

§ 102(e) Date: Sep. 11, 1996

[87] PCT Pub. No.: WO95/25198

PCT Pub. Date: Sep. 21, 1995

[30] Foreign Application Priority Data

Mar. 15, 1994 [FI] Finland ................ 941207

[51] Int. Cl.$^6$ ............................ D21C 11/00
[52] U.S. Cl. ............... 162/29; 162/30.11; 162/37; 162/38; 162/43; 162/44; 162/45
[58] Field of Search ................. 162/29, 30.11, 162/43, 44, 45; 423/DIG. 3, 432; 210/767, 768, 772

[56] References Cited

U.S. PATENT DOCUMENTS 4,388,197  6/1983  Lumikko .
4,668,342  5/1987  Blackwell .
4,929,355  5/1990  Ragnegard et al. .
5,145,556  9/1992  Westerberg et al. ................ 162/29

FOREIGN PATENT DOCUMENTS

WO A1
9412723  6/1994  WIPO .

*Primary Examiner*—Robert Popovics
*Attorney, Agent, or Firm*—Nixon & Vanderhye P.C.

[57] ABSTRACT

A method and apparatus for treating green liquor from a sulphate pulp mill enhances the clarification of the green liquor and may easily be integrated into existing pulp mills. A first portion of the green liquor from the sulphate pulp mill is clarified in a clarifier to produce a clarified green liquor and a dregs-containing green liquor. The dregs-containing green liquor is filtered in a green liquor filter to produce filtrate and dregs. The filtrate is combined) with the clarified green liquor to produce a first combined stream; and the dregs are filtered in a dregs filter. A second portion of green liquor from the sulphate pulp mill is combined with the dregs-containing green liquor to produce a second combined stream, and the second combined stream is introduced into the green liquor filter. The dregs from step (b) are washed prior to filtering the dregs, the green liquor filter and washer comprising a single structure.

18 Claims, 1 Drawing Sheet

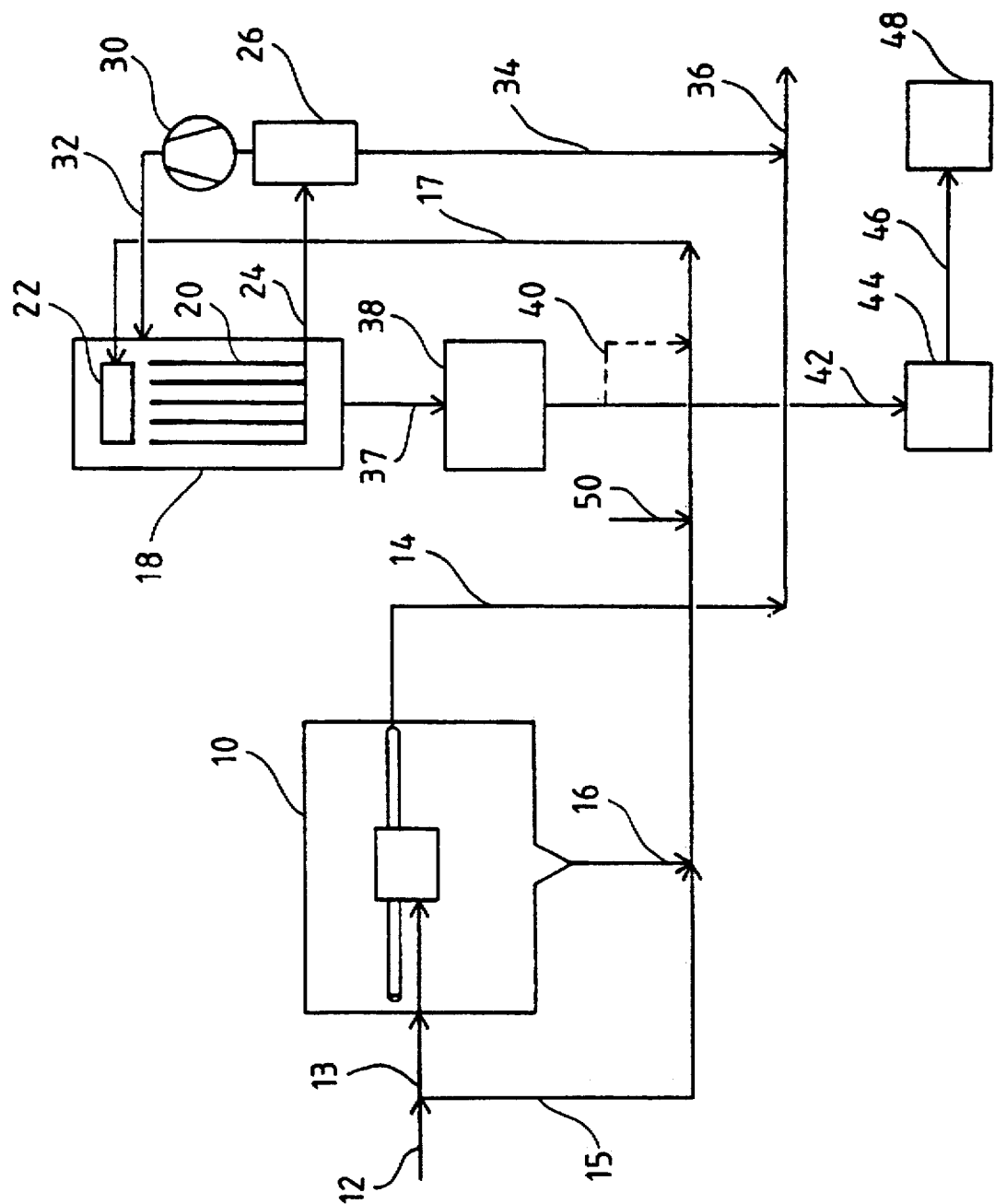

CLARIFYING AND/OR FILTERING OF GREEN LIQUOR AND AN APPARATUS THEREFORE

CROSS REFERENCE TO RELATED APPLICATION

This application is a U.S. national phase of PCT/FI95/00125, International Publication No. WO 95/25198.

BACKGROUND AND SUMMARY OF THE INVENTION

The present invention relates to a method of and an apparatus for treating green liquor formed in a sulphate pulp mill, especially to a method of and an apparatus for enhancing the clarifying of green liquor.

An essential part of the process of producing kraft pulp is chemical recovery. The chemical recovery process includes production of white liquor by causticizing, whereby lime milk and green liquor are allowed to react so as to produce lime mud and white liquor. Green liquor is produced by directing a chemical melt containing sodium chemicals from the bottom of the furnace of a recovery boiler into a separate dissolving tank, in which the melt is dissolved into weak white liquor. The most important chemicals contained by the green liquor are sodium carbonate and sodium sulphide. Green liquor also contains insoluble compounds, such as oxides of metals, silicates, soot and other impurities. The insoluble impurities, dregs, are a light, fluffy material that must be removed from the green liquor. Otherwise these compounds will be concentrated in the chemical recovery loop which is detrimental to the production of white liquor by causticizing.

Usually the dregs are separated from the green liquor by settling in a clarifier, which is a vertical cylinder with a spherical bottom. In the middle of the clarifier is a smaller cylinder, into which the green liquor is introduced and in which the flow is damped. The dregs settle on the bottom of the clarifier and are scraped from there into a pocket at the bottom of the clarifier and then introduced to a dregs filter, in which the dregs are washed with water for recovering alkali. The alkaline washing liquid is used in the melt dissolver, while the clarified green liquor is directed to causticizing.

Usually the clarifier functions both as a storage tank and a dregs separator. The bottom functions as a clarifier and the rest as a storage tank. Clarified liquor rises from the clarifier portion to the storage portion, from which clarified liquor is discharged as needed through a liquor discharge duct. Because of the fineness of the dregs to be separated the separation process must be highly efficient. As the size of the mills increases and environmental regulations tighten, separation by clarifying conventionally leads to large equipment, with the diameters of clarifiers exceeding 30 meters. Additionally, a clarifying process is always sensitive to disturbances, such as fluctuations in pulp production process, whereby even a correctly dimensioned equipment yields green liquor with too much impurities.

So, in order to succeed, clarifying requires stability in both the quality and quantity of the introduced green liquor. An increase in the quantity of treated liquor would thereby necessitate an additional clarifier. An alternative is to treat part of the green liquor by filtering it with a filter parallel with the clarifier. Nevertheless, in this case directing the dregs from both the clarifier and the additional filter to the dregs filter, in which the separated dregs are washed, could result in overloading the dregs filter of the mill.

The purpose of the present invention is to provide a method capable of increasing the capacity and/or operation capability of an existing green liquor clarifier without sacrificing the quality of the clarified green liquor. An enhanced operation capability can be useful, should the rate of settling of the dregs decrease for some reason. Further, another purpose of the invention is to improve the operation of the dregs filter regardless of any increase in the quantity of green liquor.

Characterizing features of the method according to the invention for achieving the above-mentioned purposes are that a) at least a portion of the green liquor stream of the mill is directed to a clarifier, from which clarified green liquor is discharged from the top and dregs-containing green liquor from the bottom; and b) dregs-containing green liquor from step a) is introduced into a filter, in which it is filtered for separating filtrate from dregs.

Characterizing features of the apparatus according to the invention are that it comprises a clarifier and a filter connected in series for introducing dregs-containing green liquor from the clarifier to the filter, means for introducing green liquor into the filter, means for discharging clarified green liquor from the clarifier and a duct for discharging filtered green liquor from the filter and means for removing green liquor dregs from the filter.

The connection according to the invention enables a portion of the green liquor stream to be introduced past the clarifier directly to the filter along with the dregs-containing green liquor.

The method and apparatus according to the invention enhance the clarification of green liquor by connecting a filter in series with the clarifier, the filter further treating the dregs-containing green liquor from the clarifier. The dregs separated from the green liquor can, at this stage, be also washed in this filter for recovering alkali. According to present practice the dregs are washed at the dregs filter. Thus, the present invention greatly improves and enhances the operation of the solids filter, as the alkali content of the dregs to be filtered there is greatly reduced. Also, the filter produces a much more concentrated dregs than the clarifier. Usually, the solids concentration of the dregs from a clarifier is about 2-3%, whereas the connection according to the present invention can increase the concentration to about 5-15%.

The method according to the invention is not as prone to various disturbances as clarification alone. Should the clarification be for some reason disturbed, the volume of clarified green liquor from the clarifier can be reduced to include only the clearest green liquor. The volume of the stream of dregs-containing green liquor to the filter is then accordingly increased. Thus, both the clarifier and the filter produce green liquor with a low enough dregs content for further use.

The method of the invention is for treating green liquor of a sulphate pulp mill to enhance clarification thereof, and/or to enhance utilization thereof. The method comprises the steps of: (a) clarifying at least a portion of the green liquor from the sulphate pulp mill to produce a clarified green liquor and a dregs-containing green liquor; (b) filtering the dregs-containing green liquor to produce filtrate and dregs; (c) combining the filtrate from step (b) with the clarified green liquor from step (a) to produce a first combined stream; and (d) washing and then filtering, or filtering, the dregs from step (b). The filtering takes place in a dregs filter. Also, the green liquor treated in step (a) may comprise a first portion of green liquor from the sulphate pulp mill and there may be a further step of combining a second portion of green liquor from the sulphate pulp mill with the dregs-containing green liquor from step (a) to produce a second combined stream, and using the second combined stream in the practice of step (b).

The filter connected in series with the clarifier can be any filter capable of treating dregs-containing green liquor. Such filters include, e.g., drum, disk and tube filters with a filtering layer formed by lime mud. Corresponding vacuum filters can also be used. A preferred filter for this purpose is described in international patent application PCT/FI94/00485.

BRIEF DESCRIPTION OF THE DRAWING

The drawing is a schematic illustration of exemplary apparatus for carrying out an exemplary method according to the present invention.

DETAILED DESCRIPTION OF THE DRAWING

The green liquor to be treated is introduced into the clarifier 10 via ducts 12 and 13. Clarified green liquor with low enough dregs content is discharged from the clarifier via conduit 14, while dregs-containing green liquor is directed from the bottom of the clarifier 10 to the filter 18 via duct 16.

Because the dregs conduit 16 of many an old clarifier is underrated for the volume of green liquor to be treated by the filter after an increase in the stream of liquor, a portion of the green liquor is directed past the clarifier to the filter 18 via duct 15.

In this embodiment the filter is an apparatus as described in the international patent application PCT/FI94/00485, the apparatus comprising a plurality of filter elements having filter surfaces. The green liquor to be treated is directed via ducts 16 and 17 to a liquid distribution tray 22 located above the filter elements, in which the green liquor is divided to flow down on the filter surface of the elements. The film of liquid, flowing downwards, is filtered through the filter surfaces of the elements so that the filtrate flows through the surface while the solids remain on the surface. The filtrate, i.e. filtered green liquor, is discharged from the filter via duct 24 into tank 26, where gas 28 is separated from the filtrate. The gas can be recycled to the filter via a compressor 30 located along duct 32. The filtered green liquor is directed away from the tank 26 along duct 34 and directed together with clarified green liquor via duct 36 to further treatment at the causticizing plant.

The green liquor from the filter can also be separately treated, i.e. it is not taken to the causticizing plant for production of white liquor. Filtered green liquor is usually cleaner than clarified green liquor, so it can be utilized in, e.g., the bleaching process. Sodium carbonate is separated from the filtered green liquor and then further causticized into sodium hydroxide to be used in bleaching. Separation of sodium carbonate produces high-sulphidity green liquor to be preferably used in the initial phase of pulp cooking.

Unfiltered dregs-containing green liquor is collected on the bottom of the filter, from where it is removed via duct 37 and redirected via sludge tank 38 (or directly from the filter) to the filtration surface via ducts 40 and 17. Dregs slurry is removed from the process via duct 42, tank 44 and duct 46 to the dregs filter 48.

The load on the actual dregs filter 48 can be lightened by the method according to the invention, as the invention provides for washing the dregs already in the filter 18. In this case dregs are intermittently filtered in the filter 18. Instead of removing dregs slurry from the tank 38 during a filtration cycle, it is recycled and concentrated. At the end of the filtration cycle, the feed of green liquor to the filter is replaced by washing water from duct 50 and filtration is continued. Washing water, while mixing with the dregs, removes alkali therefrom. Subsequent to the washing, dregs are removed to the solids filter 48. Thus treated, dregs are cleaner and thicker than dregs that have been conventionally directed from a clarifier directly to the dregs filter.

The efficiency of dregs washing can be improved by allowing it to form a cake on the filtration surface. The filter 18 can also be a pressure or vacuum filter known per se, with either a drum or a disk as the filter element.

The present invention is highly preferable in cases where the existing clarifier is either overloaded or its capacity must be increased. The advantages provided by the invention are listed in the following:

the clarifier can be operated at its rated capacity, whereby it produces clean liquor;

the space required by the new piece of machinery (the filter) is small;

all the dregs of the mill are treated in the filter, whereby the concentration of the dregs is higher when it is directed for further treatment;

all the dregs can be pre-washed;

the actual dregs washing apparatus (dregs filter) is capable of treating more dregs than when collecting dregs from the bottom of the clarifier;

when increasing the production of the mill, the capacity of existing machinery is often sufficient for final washing of dregs, even though the amount of dregs increases.

We claim:

1. A method of treating green liquor of a sulphate pulp mill to enhance clarification thereof, comprising the steps of:
   (a) clarifying at least a portion of the green liquor from the sulphate pulp mill to produce a clarified green liquor and a dregs-containing green liquor;
   (b) filtering the dregs-containing green liquor to produce filtrate and dregs;
   (c) combining the filtrate from step (b) with the clarified green liquor from step (a) to produce a first combined stream; and
   (d) filtering the dregs from step (b) in a dregs filter.

2. A method as recited in claim 1 wherein the green liquor treated in step (a) comprises a first portion of green liquor from the sulphate pulp mill; and comprising the further step of combining a second portion of green liquor from the sulphate pulp mill with the dregs-containing green liquor from step (a) to produce a second combined stream, and using the second combined stream in step (b).

3. A method as recited in claim 2 comprising the further step of (e) washing the dregs from step (b) prior to filtering the dregs in step (d).

4. A method as recited in claim 3 wherein steps (e) and (b) are practiced in a common filter.

5. A method as recited in claim 2 comprising the further step of treating the first combined stream to produce white liquor.

6. A method as recited in claim 3 comprising the further step of treating the first combined stream to produce white liquor.

7. A method as recited in claim 1 comprising the further step of (e) washing the dregs from step (b) prior to filtering the dregs in step (d).

8. A method as recited in claim 7 wherein steps (e) and (b) are practiced in a common filter.

9. A method as recited in claim 7 comprising the further step of treating the first combined stream to produce white liquor.

10. A method as recited in claim 1 comprising the further step of treating the first combined stream to produce white liquor.

11. A method as recited in claim 1 wherein step (a) is practiced in an existing operating clarifier in a pulp mill; and comprising the further step of adding a green liquor filter for practicing step (b) to the sulphate pulp mill, and then operating the green liquor filter to practice step (b).

12. A method of treating green liquor of a sulphate pulp mill having a bleach plant, to enhance utilization thereof, comprising the steps of:

(a) clarifying at least a portion of the green liquor from the sulphate pulp mill to produce a clarified green liquor and a dregs-containing liquor;

(b) filtering the dregs-containing liquor to produce filtrate and dregs;

(c) using the clarified liquor from step (a) to produce white liquor; and (d) utilizing the filtrate from step (b) in the bleach plant.

13. A method as recited in claim 12 wherein step (d) is practiced by separating sodium carbonate from the filtrate, and causticizing the filtrate into sodium hydroxide, and using the sodium hydroxide to facilitate bleaching in an alkaline bleaching stage in the bleach plant.

14. A method as recited in claim 13 comprising the further step (e) of using the filtrate from which sodium carbonate has been separated as a high-sulphidity green liquor in an initial phase of pulp cooking in the pulp mill.

15. A method as recited in claim 12 comprising the further step (e) of washing the dregs from step (b).

16. A method as recited in claim 15 comprising the further step of filtering the dregs in a dregs filter after the practice of step (e).

17. A method of treating green liquor of a sulphate pulp mill to enhance clarification thereof, comprising the steps of:

(a) clarifying at least a portion of the green liquor from the sulphate pulp mill to produce a clarified green liquor and a dregs-containing green liquor;

(b) filtering the dregs-containing green liquor to produce filtrate and dregs;

(c) combining the filtrate from step (b) with the clarified green liquor from step (a) to produce a first combined stream; and (d) washing the dregs from step (b).

18. A method as recited in claim 17 wherein the green liquor treated in step (a) comprises a first portion of green liquor from the sulphate pulp mill; and comprising the further step of combining a second portion of green liquor from the sulphate pulp mill with the dregs-containing green liquor from step (a) to produce a second combined stream, and using the second combined stream in step (b).

* * * * *

UNITED STATES PATENT AND TRADEMARK OFFICE
CERTIFICATE OF CORRECTION

PATENT NO. : 5,788,813

DATED : August 4, 1998

INVENTOR(S) : Engdahl et al.

It is certified that error appears in the above-identified patent and that said Letters Patent is hereby corrected as shown below:

Claim 13, line 3, change "causticizing the filtrate" to --causticizing the sodium carbonate--.

Signed and Sealed this

Sixteenth Day of February, 1999

Attest:

*Acting Commissioner of Patents and Trademarks*

*Attesting Officer*